United States Patent [19]
Koganezawa et al.

[11] Patent Number: 6,071,441
[45] Date of Patent: Jun. 6, 2000

[54] METHOD OF MANUFACTURING DISTRIBUTED REFRACTIVE INDEX OPTICAL FIBER

[75] Inventors: Koji Koganezawa; Noriyuki Yoshihara; Tsuyoshi Onishi; Takashi Tsukamoto, all of Yokohama, Japan

[73] Assignee: Asahi Glass Company Ltd., Tokyo, Japan

[21] Appl. No.: 09/147,258

[22] PCT Filed: Mar. 12, 1998

[86] PCT No.: PCT/JP98/01047

§ 371 Date: Nov. 13, 1998

§ 102(e) Date: Nov. 13, 1998

[87] PCT Pub. No.: WO98/40768

PCT Pub. Date: Sep. 17, 1998

[30] Foreign Application Priority Data

Mar. 13, 1997 [JP] Japan .................................. 9-059081

[51] Int. Cl.[7] ...................................................... B29D 11/00
[52] U.S. Cl. ............................ 264/1.24; 264/1.7; 264/2.1
[58] Field of Search .................................. 264/1.24, 1.29, 264/1.7, 2.1, 310, 311; 425/808, 434, 435

[56] References Cited

U.S. PATENT DOCUMENTS

| 4,022,855 | 5/1977 | Hamblen | 264/2.1 |
| 4,541,969 | 9/1985 | Neefe | 264/2.1 |

FOREIGN PATENT DOCUMENTS

| 54-5743 | 1/1979 | Japan . |
| 60-119510 | 6/1985 | Japan . |
| 5-107404 | 4/1993 | Japan . |
| 8-5848 | 1/1996 | Japan . |
| 8-110419 | 4/1996 | Japan . |
| 8-334633 | 12/1996 | Japan . |

*Primary Examiner*—Mathieu D. Vargot
*Attorney, Agent, or Firm*—Oblon, Spivak, McClelland, Maier & Neustadt, P.C.

[57] ABSTRACT

A cylindrical base material having an outer and inner at least two layer structure is produced by using a cylindrical molded body made of a low-refractive-index material as a mold, and forming at least one layer made of a layer-forming material having a relatively high refractive index in the inner surface of the cylindrical molded body by the rotational molding, wherein the centrifugal force during the rotational molding is changed.

35 Claims, 12 Drawing Sheets

A (CORE= 4.7)

A (CORE= 9.0)

F I G . 25
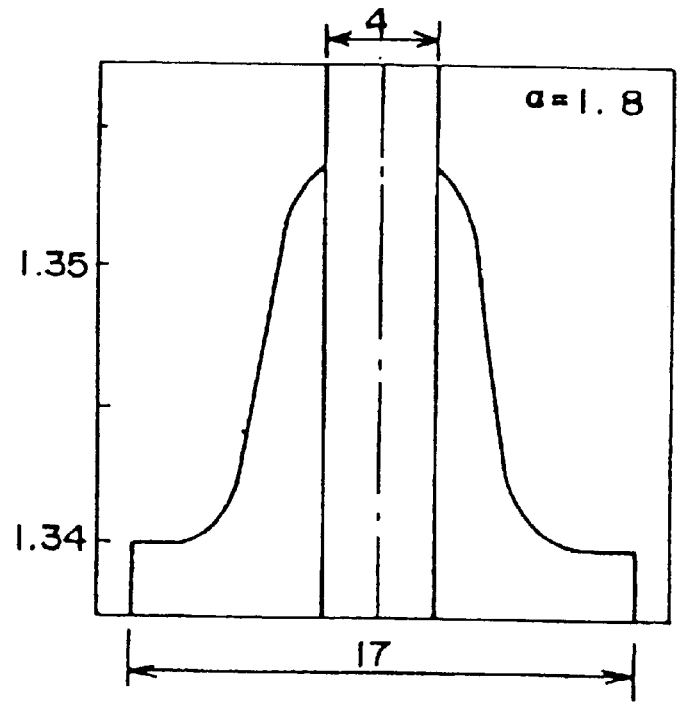
F I G . 26
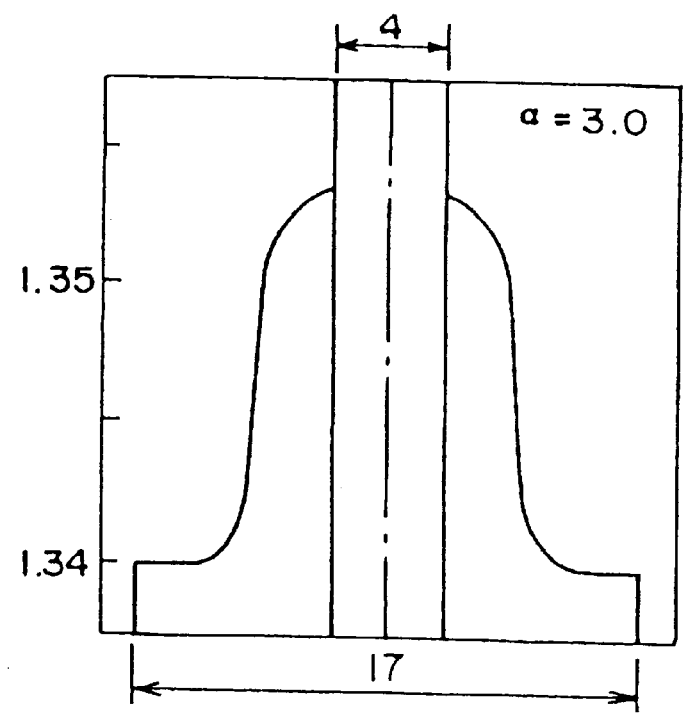

METHOD OF MANUFACTURING DISTRIBUTED REFRACTIVE INDEX OPTICAL FIBER

BACKGROUND OF THE INVENTION

1. Field of the Invention

The present invention relates to a method for producing a graded-refractive-index optical fiber (hereinafter sometimes referred to as GI type optical fiber for short) having high transparency and high heat resistance simultaneously, from a base material (preform), which was difficult to attain with conventional optical plastics.

The GI type optical fiber obtained by the present invention is an amorphous resin and thus is free from light scattering and very transparent to light at wavelengths within a wide range from ultraviolet light to near infrared light. Therefore, it is useful for optical systems for light of various wavelengths. In particular, the GI type optical fiber obtained by the present invention provides a light transmission medium with small losses at wavelengths of 1,300 nm and 1,550 nm, at which a trunk vitreous silica fiber is used in the field of optical communication.

2. Description of the Background

It has been known by JP-A-8-334633 to produce the GI type optical fiber by using an amorphous fluoropolymer (a) which has no C—H bond and a substance (b) which differs in refractive index by at least 0.001 in such a manner that a cylindrical molded body made of a low-refractive-index material is used as a mold, and made to contain a layer-forming material having a high refractive index on its inner surface, and it is subjected to rotational molding so that the layer-forming material having a high refractive index thermally diffuse during the rotational molding to form a cylindrical base material having an inner and outer at least two layer structure; and the obtained cylindrical base material is then formed into a fiber.

In the above method for production of the GI type optical fiber, by making the base material cylindrical, there will be no voids, bubbles or deformation resulting from cooling shrinkage of the resin, and no light scattering body will form, and thus, the transmission property improves. However, there was a defect that the hollow part is likely to remain in the fiber when the cylindrical base material is formed into a fiber.

Further, there was a defect that it is difficult to optionally change the refractive index distribution form, and in many cases, the distribution form is determined uniformly, and it is difficult to obtain the refractive index distribution form suitable for the required property of e.g. a light source, a light receiver or a connector.

SUMMARY OF THE INVENTION

The present invention has been made to solve the above problems and provides (1) A method for producing the graded-refractive-index optical fiber which comprises using an amorphous fluoropolymer (a) which substantially has no C—H bond, and at least one substance (b) which differs from the fluoropolymer (a) in refractive index by at least 0.001; using a cylindrical molded body made of a low-refractive-index material selected from at least one member of the above materials as a mold, forming at least one layer made of a layer-forming material having a relatively high refractive index selected from at least one member of the above materials, on the inner surface of the cylindrical body material by rotational molding; forming a cylindrical base material having an inner and outer at least two layer structure; and forming the obtained cylindrical base material into a fiber, wherein the centrifugal force is changed during the rotational molding, (2) A method for producing a graded-refractive-index optical fiber, which comprises using an amorphous fluoropolymer (a) which substantially has no C—H bond and at least one material which differs from the fluoropolymer (a) in refractive index by at least 0.001; using a cylindrical molded body made of a low-refractive-index material selected from at least one member of the above materials as a mold, forming at least one layer made of a layer-forming material having a relatively high refractive index selected from at least one member of the above material on the inner surface of the cylindrical base material by rotational molding; forming a cylindrical base material having an inner and outer at least two layer structure; and forming the obtained cylindrical base material into a fiber, wherein forming into a fiber is conducted while the hollow part of the above cylindrical base material is kept under reduced pressure.

DETAILED DESCRIPTION OF THE PREFERRED EMBODIMENTS

Now, the fluoropolymer (a) which is a material for the GI type optical fiber, the substance (b), and the GI type optical fiber, will be described first, and then, the method for producing the GI type optical fiber form the cylindrical base material will be described.

With regard to the fluoropolymer (a)

Heretofore, a tetrafluoroethylene resin, a perfluoro (ethylene-propylene) resin, a perfluoroalkoxy resin, a vinylidene fluoride resin, an ethylene-tetrafluoroethylene resin, a chlorotrifluoroethylene resin, etc. have been widely known as fluoropolymers. However, since these fluorine-containing resins are crystalline and cause light scattering, they are poor in transparency and unfavorable as materials for plastic optical fibers.

Whereas, amorphous fluoropolymers are free from light scattering due to crystals and therefore excellent in transparency. The fluoropolymer (a) of the present invention is not particularly limited as long as it is an amorphous fluoropolymer having no C—H bond. However, a fluoropolymer having a cyclic structure in its main chain is preferred. As a fluoropolymer having a cyclic structure in its main chain, a fluoropolymer having a fluorine-containing alicyclic structure, a fluorine-containing cyclic imide structure, a fluorine-containing triazine ring structure or a fluorine-containing aromatic ring structure is preferred. Among fluoropolymers having a fluorine-containing alicyclic structure, those having a fluorine-containing aliphatic ether ring structure, are more preferred.

A fluoropolymer having a fluorine-containing alicyclic structure is less likely to undergo orientation of polymer molecules, when hot drawn or melt spun into a fiber, as compared with fluoropolymers having a fluorine-containing cyclic imide structure, a fluorine-containing triazine ring structure or a fluorine-containing aromatic structure. Consequently, it does not cause light scattering, and therefore is a more preferred polymer.

The viscosity of the fluoropolymer (a) in a molten state is preferably from $10^3$ to $10^5$ poise at a melt temperature of from 200° C. to 300° C. If the melt-viscosity is too high, not only melt spinning is difficult, but also the diffusion of the substance (b) required for a refractive index gradation hardly takes place, and formation of a refractive index gradation is difficult. On the other hand, if the melt-viscosity is too low, there are practical problems. Namely, in the case wherein used as a light transmission medium in an electronic equipment or an automobile, it becomes soft upon exposure to a high temperature, and the light transmission performance becomes poor.

The number-average molecular weight of the fluoropolymer (a) is preferably from 10,000 to 5,000,000, more preferably from 50,000 to 1,000,000. If the molecular weight is too small, the heat resistance may be impaired, and if it is too large, it becomes difficult to form an optical fiber having a refractive index gradation, such being unfavorable.

As a polymer having a fluorine-containing alicyclic structure, preferred is one obtainable by polymerization of a monomer having a fluorine-containing structure, or a polymer having a fluorine-containing alicyclic structure in its main chain which is obtainable by cyclic polymerization of a fluorine-containing monomer having at least two polymerizable double bonds.

A polymer having a fluorine-containing alicyclic structure in its main chain which is obtainable by polymerizing a monomer having a fluorine-containing alicyclic structure, is reported, for example, by JP-B-63-18964. Namely, a polymer having a fluorine-containing alicyclic structure in the main chain can be obtained by homopolymerization of a monomer having a fluorine-containing alicyclic structure such as perfluoro(2,2-dimethyl-1,3-dioxole), or by copolymerization of such a monomer with a radical polymerizable monomer such as tetrafluoroethylene, chlorotrifluoroethylene, perfluoro(methyl vinyl ether).

Further, a polymer having a fluorine-containing alicyclic structure in the main chain which is obtainable by cyclic polymerization of a fluorine-containing monomer having at least two polymerizable double bonds, is reported, for example, by JP-A-63-238111 or JP-A-63-238115. Namely, a polymer having a fluorine-containing alicyclic structure in its main chain can be obtained by cyclic polymerization of a monomer such as perfluoro(allyl vinyl ether) or perfluoro(butenyl vinyl ether), or copolymerization of such a monomer with a radical polymerizable monomer such as tetrafluoroethylene, chlorotrifluoroethylene or perfluoroethylene(methyl vinyl ether).

Further, a polymer having a fluorine-containing alicyclic structure in its main chain can be obtained also by copolymerization of a monomer having a fluorine-containing alicyclic structure such as perfluoro(2,2-dimethyl-1,3-dioxole) with a fluorine-containing monomer having at least two polymerizable double bonds such as perfluoro(allyl vinyl ether) or perfluoro(butenyl vinyl ether).

As examples of the above-mentioned polymer having a fluorine-containing structure, those having repeating units selected from the following formulae (I) to (IV) may be mentioned. Part of the fluorine atoms in such a polymer having a fluorine-containing alicyclic structure may be substituted by chlorine atoms for the purpose of increasing the refractive index.

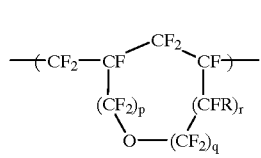

(I)

-continued

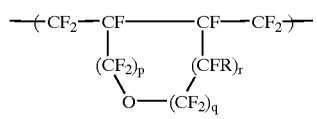

(II)

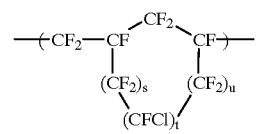

(III)

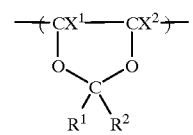

(IV)

[In the above formulae (I) to (IV), p is from 0 to 5, q is from 0 to 4, r is from 0 to 1, p+q+r is from 1 to 6, each of s, t, u is from 0 to 5, s+t+u is from 1 to 6, R is F or $CF_3$, $R^1$ is F or $CF_3$, $R^2$ is F or $CF_3$, $X^1$ is F or Cl, and X is F or Cl.]

As the polymer having a fluorine-containing alicyclic structure, polymers having a cyclic structure in their main chains are preferred. Those containing a polymeric unit having a cyclic structure in an amount of at least 20 mol %, preferably at least 40 mol % are preferred in view of transparency and mechanical properties.

With regard to the substance (b)

The substance (b) is at least one substance which differs from the fluoropolymer (a) in refractive index by at least 0.001. It may have a higher refractive index or a lower refractive index than the fluoropolymer (a). In the present invention, it is usual to use a substance having a higher refractive index than the fluoropolymer (a).

As the substance (b), low-molecular weight compounds, oligomers and polymers containing an aromatic ring such as a benzene ring, a halogen atom such as chlorine, bromine or iodine, or a bonding group such as an ether bond are preferred. Further, the substance (b) is preferably a substance which substantially has no C—H bond for the same reason as the fluoropolymer (a). The difference in refractive index from the fluoropolymer (a) is preferably at least 0.005.

The oligomeric or polymeric substance (b) may be an oligomer or a polymer of such a monomer constituting the fluoropolymer (a) as described above, which differs from the fluoropolymer (a) in refractive index by at least 0.001. Such a monomer is selected from those which form a polymer which differs from the fluoropolymer (a) in refractive index by at least 0.001. For example, it is possible to use two kinds of fluoropolymers (a) having different refractive indices and distribute one polymer (a) in the other polymer (a), as the substance (b).

The substance (b) preferably has a solubility parameter within $7(cal/cm^3)^{1/2}$ as compared with the fluoropolymer (a). A solubility parameter is a property value which is a measure of the miscibility between materials. The solubility parameter $\delta$ is represented by the formula $\delta=(E/V)^{1/2}$, wherein E is the cohesive energy of a molecule of material, and V is the molar volume.

As a low-molecular weight compound, halogenated aromatic hydrocarbons having no hydrogen atom bonded to a carbon atom may be mentioned. Halogenated aromatic hydrocarbons containing only fluorine atoms as halogen atoms, and halogenated aromatic hydrocarbons containing a fluorine atom and another halogen atom are preferred in view of the miscibility with the fluoropolymer (a). Among such halogenated aromatic hydrocarbons, those having no functional group such as a carbonyl group or a cyano group are more preferred.

As such a halogenated aromatic hydrocarbon, a compound represented by the formula $\Phi_r$-$Z_b$ [wherein $\Phi_r$ is a b valent fluorinated aromatic ring residue having fluorine atoms substituted for all the hydrogen atoms, and Z is a halogen atom other than fluorine, —Rf, —CO—Rf, —O—Rf or —CN, wherein Rf is a perfluoroalkyl group, a polyfluoroperhaloalkyl group or a monovalent $\Phi$r, and b is 0 or an integer of at least 1] may, for example, be mentioned. As the aromatic ring, a benzene ring or a naphthalene ring may be mentioned. The carbon number of a perfluoroalkyl group or a polyfluoroperhaloalkyl group as Rf is preferably at most 5. As a halogen atom other than fluorine, a chlorine atom and a bromine atom are preferred.

As specific compounds, for example, 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene and bromoheptafluoronaphthalene may be mentioned.

As the polymeric or oligomeric substance (b) among those having the above-mentioned repeating units (I) to (IV), fluoropolymers having a different refractive index from the fluoropolymer (a) to be used in combination (for example, a combination of a fluoropolymer containing fluorine atoms only as halogen atoms with a fluoropolymer containing fluorine atoms and chlorine atoms, and a combination of two kinds of fluoropolymers obtained by polymerizing at least two monomers of different kinds in different proportions) are preferred.

Further, in addition to the above-mentioned fluoropolymers having a cyclic structure in their main chains, oligomers of monomers containing no hydrogen atom such as tetrafluoroethylene, chlorotrifluoroethylene, dichlorodifluoroethylene, hexafluoropropylene and perfluoroalkyl vinyl ether, and co-oligomers of at least two of these monomers may be used as the substance (b). Further, perfluoropolyethers having a structural unit —$CF_2CF(CF_3)$O— or —$(CF_2)nO$— (wherein n is an integer of from 1 to 3) may be used. The molecular weights of the oligomers are selected within such a range of molecular weight that they are amorphous, and are preferably from 300 to 10,000 in terms of number-average molecular weight. In view of easy diffusion, it is more preferred that the number-average molecular weights are from 300 to 5000.

The particularly preferred substance (b) is a chlorotrifluoroethylene oligomer since it is excellently compatible with the fluoropolymer (a), particularly with a fluoropolymer having a cyclic structure in its main chain. By virtue of its good compatibility, it is possible to easily mix the fluoropolymer (a), particularly the fluoropolymer having a cyclic structure in its main chain with a chlorotrifluoroethylene oligomer by hot-melting them at 200 to 300° C. It is also possible to homogeneously mix them by dissolving them in a fluorine-containing solvent and then removing the solvent. The preferred molecular weight of a chlorotrifluoroethylene oligomer is from 500 to 1500 in terms of the number-average molecular weight.

With regard to the GI type optical fiber

At the cross section of the GI type optical fiber, the substance (b) is so distributed in the fluoropolymer (a) as to have a concentration gradient in the direction of from the center to the periphery. Preferably, it is an optical fiber wherein the substance (b) is a substance having a higher refractive index than the fluoropolymer (a), and the substance (b) is so distributed as to have such a concentration gradient that the concentration of the substance (b) decreases in the direction of from the center of the optical fiber to the periphery. In some cases, an optical fiber wherein the substance (b) is a substance having a lower refractive index than the fluoropolymer (a), and the substance (b) is so distributed as to have a concentration gradient that the concentration of the substance (b) decreases in the direction of from the periphery of the optical fiber to the center, is also useful. The former optical fiber is usually produced by arranging the substance (b) at the center and diffusing the substance (b) toward the periphery. The latter optical fiber is produced by diffusing the substance (b) from the periphery toward the center.

The GI type optical fiber which is obtainable by the present invention has a transmission loss per 100 m of at most 100 dB at wavelengths of from 700 to 1,600 nm. Particularly, when a fluoropolymer having an alicyclic structure in its main chain is used, it has a transmission loss per 100 m of at most 50 dB at the same wavelength. It is quite advantageous that the transmission loss is at such a low level at relatively long wavelengths of from 700 to 1,600 nm. Namely, it has advantages that since it is available to the same wavelength as vitreous silica optical fiber, it can be connected to a vitreous silica optical fiber without any difficulties, and that a cheaper light source can be used as compared with the case of conventional plastic optical fibers which are available only to light at wavelengths shorter than from 700 to 1,600 nm.

With regard to the rotational molding in the method for production of the present invention The method for producing the base material made of a cylindrical molded body having an inner and outer at least two layer structure by producing a cylindrical molded body made of a material having a relatively low refractive index selected from the fluoropolymer (a) and the substance (b) in advance; by using a cylindrical molded body as a mold, forming at least one layer made of a high-refractive-index material on the inner surface of the cylindrical molded body by rotational molding. The other method is a method for producing the same base material by forming the above molded body to be the outer layer by rotational molding, followed by forming the inner layer by rotational molding. The base material may not necessarily have a refractive index gradation (the refractive index gradation can be formed during the aftertreatment of the base material or the spinning), but it is preferred to let the base material have a refractive index gradation at least to some extent. By forming the base material to have a refractive index gradation at least to some extent, forming a refractive index gradation during the aftertreatment or the spinning becomes easy, and the production efficiency of the GI type optical fiber improves. More preferably, the refractive index gradation of the base material and the refractive index gradation of the fiber obtained from this base material are substantially same, for reasons that the difference in the refractive index between the core and the cladding can be maintained, and also the core diameter can be made large.

During the production of the base material, the substance (b) has to be diffused from one layer to the fluoropolymer (a) in the other layer between the adjacent layers to form a refractive index gradation. For example, in a case of producing a base material made of two layers of the center and peripheral portions, it is necessary that the substance (b) is diffused from the center layer to the peripheral layer (in a case when the substance (b) has a higher refractive index than the fluoropolymer (a)), or that the substance (b) is diffused from the peripheral layer to the center layer (in a case when the substance (b) has a lower refractive index than a fluoropolymer (a)), to form a refractive index gradation. The substance (b) can be diffused usually by thermal diffusion. This diffusion can be continuously carried out during the rotational molding, or can be carried out after the rotational molding is finished.

Further, the base material having a refractive index change which is close to the refractive index degradation can be produced by changing the refractive index of the laminating material gradually, instead of diffusing the substance (b) for producing the base material. Namely, the desired base material can be produced by carrying out the lamination while gradually raising the refractive index of material to be supplied for the inside of a rotational cylindrical drum. In addition to this method, the diffusion of the substance (b) can be used jointly.

The form of the above material to be supplied for the rotational molding is not limited as long as it is in the form of a liquid such as a melt, a solution or a disperation. In the case of the solution or the disperation, the forming can be conducted while a liquid medium such as a solvent is removed by e.g. evaporation after the solution or the like is supplied into the rotational cylindrical drum. The means for supplying the material to the rotational cylindrical drum is not particularly limited. For example, a melt extrusion supply method, a flow curtain method, or a spray method may be suitably used. To supply the material uniformly in the axis direction, the material is preferably supplied to spread over the full length in the axis direction of the rotational cylindrical drum.

For example, in a case of producing the base material made of a two layer molded body, the outer layer is formed by using a cylindrical body made of the outer layer-forming material having a low refractive index, or by supplying the outer layer-forming material having a low refractive index to the rotational cylindrical drum, followed by supplying the inner layer-forming material having a high refractive index to form the inner layer, thereby to obtain the cylindrical molded body consisting of outer and inner two layers. As the outer layer-forming material, for example, fluoropolymer (a) is used, and as the inner layer-forming material, for example, a mixture of fluoropolymer (a) and substance (b) having a higher refractive index than the fluoropolymer (a) is used. In the same manner, the molded body having a multi-layer structure of at least three layers can be produced.

According to the present invention, the uniform base material having a stable refractive index gradation can be formed. And, the transmission property improves since there is no voids, bubbles or deformation resulting from the cooling shrinkage of the resin, and no light scattering body will form by making the base material cylindrical. Further, by keeping the hollow part of the base material under reduced pressure while forming the base material into a fiber, it is possible to prevent the hollow part from remaining in the fiber, and thus to avoid deterioration of the optical performance.

And by adjusting the centrifugal force during the rotational molding, the refractive index gradation can be changed to one suitable for the required property of e.g. a light source, a light receiver or a connection.

BRIEF DESCRIPTION OF THE DRAWINGS

FIG. 25 shows a refractive index gradation in the cross sectional direction of the cylindrical base material in the present invention.

FIG. 26 shows a refractive index gradation in the cross sectional direction of the cylindrical base material in the present invention (successive addition of the polymer B).

BEST MODE FOR CARRYING OUT THE INVENTION

Figure 1:
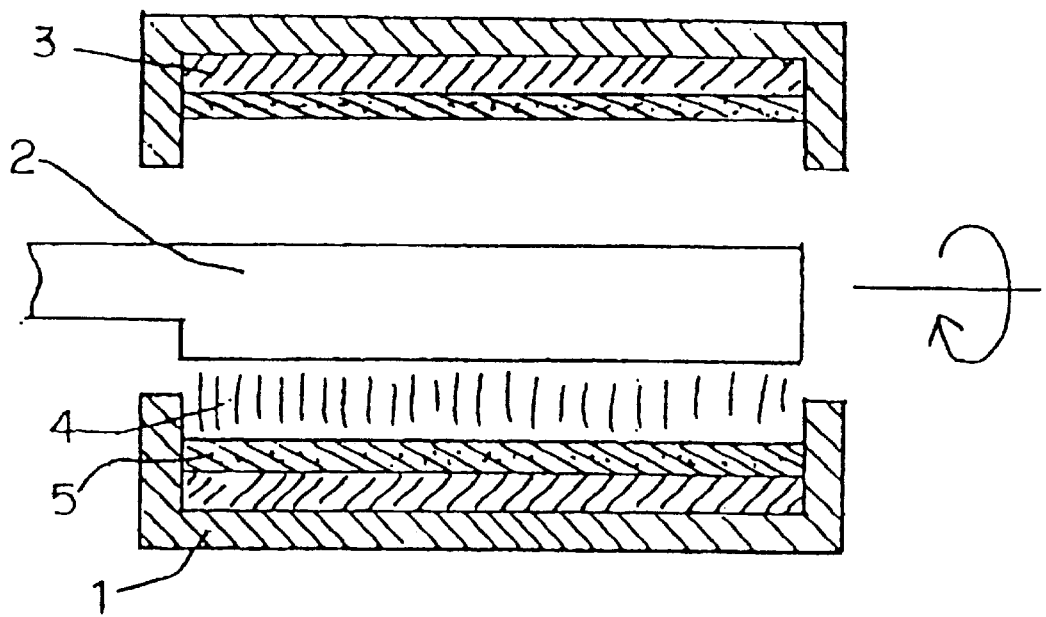
FIG. 1 is a longitudinal sectional view of a rotational cylindrical drum as a rotational molding device.
Figure 2:
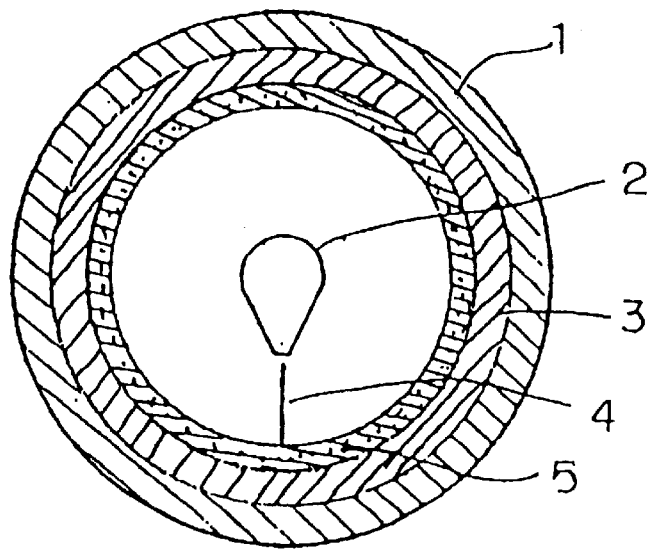
FIG. 2 is a cross sectional view of the same as above.
Figure 3:
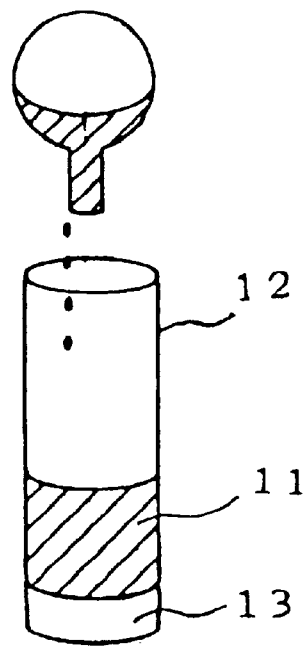
FIG. 3 is a schematic view illustrating an embodiment of the preparation for the production of a cylindrical molded body in the present invention.

As a specific example of the rotational molding, a schematic longitudinal sectional view and a cross sectional view of the rotational cylindrical drum are presented in FIG. 1 and FIG. 2, respectively. In FIG. 1 and FIG. 2, the molding device comprises a rotational cylindrical drum 1 rotating about the axis of the cylinder and a die 2 for extruding the material; an outer layer-forming material having a relatively low refractive index was supplied from the die 2 to form an outer layer 3; an inner layer-forming material 4 having a relatively high refractive index is being supplied in a molten state to the inner surface of the outer layer 3 to form an inner layer 5. The outer layer 3 may be formed by inserting and fixing a cylindrical molded body formed in advance to the rotational cylindrical drum 1. After the desired layer is formed, the rotation is continued while keeping the heated state to carry out thermal diffusion. The thermal diffusion is preferably conducted in a molten state of the material. Then, the molded body is cooled and solidified, and then taken out from the rotational cylindrical drum, to obtain the desired base material.

Figure 4:
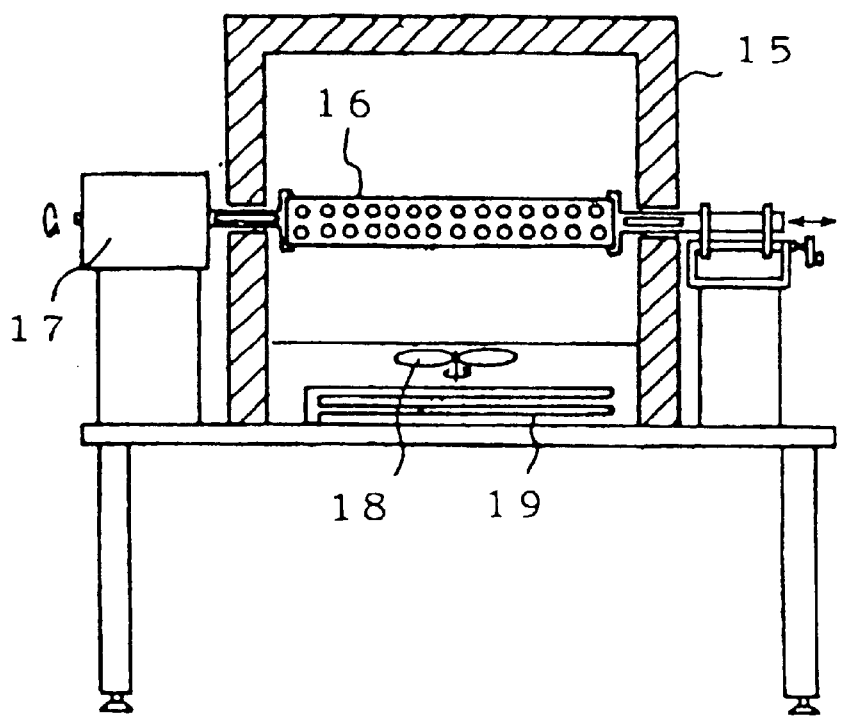
FIG. 4 illustrates a hot air circulation type oven equipped with a rotational mechanism in the present invention.
Figure 5:
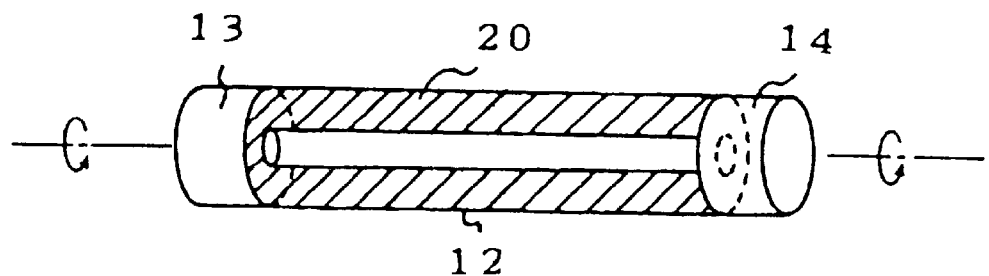
FIG. 5 is a schematic view illustrating an embodiment of the method for the production of the cylindrical molded body in the present invention.

The material for the rotational cylindrical drum is not particularly limited, but it is preferably made of a corrosion-resistance metal such as stainless steel or glass. Another example of the rotational molding is a method wherein a cylindrical outer wall material corresponding to the above outer layer 3 is formed in advance, and it is set in the rotational tube 16 as illustrated in FIG. 4 and subjected to rotational molding. In the hollow part of the cylindrical outer wall material 12 as illustrated in FIG. 5, the inner layer-forming material such as the substance (b) is sealed by means of plugs 13 and 14, and then, it is set in a rotational tube 16 and rotated while keeping the hollow part under reduced pressure, to obtain a cylindrical base material having an inner and outer at least two layer structure.

As the material for the rotational cylindrical drum, a plastic tube such as polytetrafluoroethylene (PTFE) or tetrafluoroethylene-perfluoroalkylvinylether copolymer (PFA), can be used, besides a corrosion-resistant metal or a glass tube.

Figure 6:
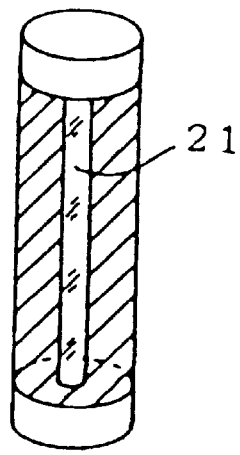
FIG. 6 is a schematic view illustrating an embodiment of the method for the production of the cylindrical molded body in the present invention.

Further, the cylindrical molded body 20 can be formed also in such a manner that in the glass tube 12, a glass rod 21 having an outer diameter corresponding to the inner diameter of the cylindrical molded body 20, is held at the center of the glass tube 12 by means of plugs 13 and 14, then the molten polymer A, is introduced, and after cooling, the glass tube 12 is removed, and the cylindrical molded body is dipped in an aqueous hydrofluoric acid solution to dissolve the glass rod 21 (FIG. 6).

Concentric circular layers having different refractive indices of the base material can be not only two layers but also three layers or more. Even in such a case, basically the center or a layer close to the center is made of a material having a higher refractive index than layers remote from the center. As mentioned above, the substance (b) may have a higher refractive index or a lower refractive index than the fluoropolymer (a). Thus, in a case where the substance (b) has a higher refractive index than the fluoropolymer (a), the substance (b) exists in a higher concentration at the center or in a layer close to the center, and in a case where the substance (b) has a lower refractive index than the fluoropolymer (a), the substance (b) exists in a higher concentration in the outermost layer or in a layer close to the outermost layer.

Preferably the base material is the substance (b) having a higher refractive index than the fluoropolymer (a) (hereinafter this substance (b) is referred to as substance (b')), and has a composition such that the substance (b') exists in the inner layer-forming material in a relatively high concentration. In such a case, the inner layer-forming material may consist solely of the substance (b') or may be a mixture of the substance (b) and the fluoropolymer (a). In many cases, the mechanical properties and forming properties of the substance (b') are not enough, and it is usually preferred that the inner layer-forming material consists of a mixture of the substance (b') and the fluoropolymer (a). The outer layer-forming material may consist solely of the fluoropolymer (a) or may be a mixture of the fluoropolymer (a) and the substance (b') (the concentration of the substance (b') is lower than that of the inner layer-forming material). And, the outer layer-forming material may be a material consisting of a mixture of the fluoropolymer (a) and the substance (b) having a lower refractive index than fluoropolymer (a). When the base material consists of a multi-layer structure of at least three layers, the closer the layer is to the center, the higher the concentration of the substance (b') the material has (but it is lower than the concentration at the center), and the closer the layer is to the outermost layer, the lower the concentration of the substance (b') the material has. The substance (b) having a lower refractive index than the fluoropolymer (a), may be disposed in the outermost layer or a layer close to the outermost layer.

And, according to the production method of the present invention, by positively adjusting the ratio of the inner diameter to the outer diameter of the cylindrical base material, the amount of the substance (b) to be added, the centrifugal force during the rotational molding and the diffusion temperature, the refractive index gradation and the core diameter of the fiber can freely be controlled, a fiber having the refractive index gradation, with which the transmission zone properties improve most at the respective wavelengths, can easily be produced and further the core diameter can be adjusted to be suited to the opening diameter of the light source and the light receiving source. Here, the core diameter means the diameter of the core part wherein at least 5% of the max intensity occupies in the intensity distribution of light emitted from the fiber in the fiber diameter direction.

Now, the production method of the base material in the present invention will be explained. The outer diameter of the cylindrical base material is not particularly limited, but is preferably from 10 to 100 mm. If the outer diameter is too small, the productivity tends to be poor, and if the outer diameter is too large, a long period of time is required for the thermal diffusion and it tends to be difficult to make the temperature of the whole of the base material uniform during the wiredrawing of the base material, whereby the diameter of a fiber tends to be irregular.

Next, the ratio of the inner diameter to the outer diameter of the cylindrical base material is preferably from 10% to 70%, more preferably from 20% to 40%. If the ratio of the inner diameter is too small, the void occurrence resulting from the heat shrinkage is less likely to be inhibited, and the time for the thermal diffusion tends to be long. And, if the ratio is too large, the inner diameter part does not adhere sufficiently during the wiredrawing, whereby the fiber diameter tends to be irregular, and the transmission loss deteriorates.

Further, the larger the ratio of the inner diameter to a constant outer diameter, the larger the ratio of the core diameter to the outer diameter of the fiber (core diameter ratio) can be made, and a value represented by the following formula, showing the refractive index gradation in the core radius direction, can be changed:

$$N(r)=n_1[1-2\Delta(r/a^\alpha)]^{1/2}$$

$$\Delta=n_1^2-n_2^2/2n_1^2$$

N(r): Refractive index in radius r direction
a: Core radius
$n_1$: Core refractive index
$n_2$: Cladding refractive index The refractive index gradation when α-value is an infinity, shows a stepped gradation profile (SI type) wherein it becomes equal to the refractive index $n_1$ of core center at a range of from r=0 (core center) to a (core outermost part), then rapidly becomes equal to the refractive index $n_2$ of the cladding material. And, in a case where α value is 1, the profile shows a slant face-like gradation profile wherein $n_1$ at r=0 (core center) and $n_2$ at r=a (core outermost part) are connected by a straight line. When α value is in the range there between, the profile is a quadratic curve connecting r=0 ($n_1$) and r=a ($n_2$).

It has been known that the amount of light transmission of a fiber is changed by changing the α-value, and the α-value is calculated to obtain the maximum amount of light transmission for each fiber material.

Perfluoro(butenyl vinyl ether) is selected as the material, and the optical a value calculated from the data of wavelength dependency of its refractive index is found out to be 1.96 at the wavelength of 1,300 nm used. And, the proportion and the concentration of the substance (b) to be thermally diffused to the cylindrical base material, are not particularly limited. However, in a case where the cylindrical base material of the same size is used, when the proportion is increased then the core diameter ratio can be made large, and the α value of the refractive index profile can be made small. In a case where the substance (b) has a high viscosity, it may be diluted, for example, by the fluoropolymer (a) used for the cylindrical base material.

The rotational speed for the rotational forming to obtain the cylindrical base material by rotational molding, i.e. the centrifugal force which acts on the inner diameter part is preferably within a range of from 0.1 to 300 G, more preferably within a range of from 1 to 50 G. Here, G means a force of 9.8 m×k×$S^{-2}$. If the centrifugal force is too small, after diffusion, lack of the surface smoothness of the inner diameter part of the cylindrical base material is brought about, the residues of the inner diameter part remain in the inside of the fiber during forming into a fiber, and the transmission losses deteriorate. If the centrifugal force is too large, it is difficult to conduct the rotational molding of the large cylindrical base material safely, and if the relative density of the substance (b) to the fluoropolymer (a) is particularly small, the diffusion of the substance (b) occurs all at once by the centrifugal force, thus the control of the distribution becomes difficult. The timing for changing the centrifugal force and the amount of the change are not particularly limited. The centrifugal force can be changed continuously, stepwisely, or intermittently. And, the change can be an increase, a decrease, or a combination of increase and decrease. Usually, the core diameter can be made large by increasing the centrifugal force. For example, in a case where it is desired to maintain the difference in the refractive index of the core and the cladding, and also to make the core diameter large, it is effective to increase the centrifugal force by preferably from 1.5 to 30 times, more preferably from 2 to 20 times when from 50 to 90% of the predetermined diffusion time has passed.

The diffusion temperature of the cylindrical base material when the substance (b) is thermally diffused is not particularly limited. However, it is selected to be higher than the glass transition temperature of the fluoropolymer (a) and lower than the pyrolysis temperature of the fluoropolymer (a). The fluoropolymer (a) has to be sufficiently plasticized so that the substance (b) is easily diffused, and the diffusion temperature at which the melt viscosity is from $10^3$ to $10^5$ poise is preferred. The timing for changing the diffusion temperature and the degree of changing are not particularly limited. However, in a case where it is desired to maintain the difference in the refractive index of the core and the cladding and also to make the core diameter large, it is effective to increase the atmosphere temperature of the cylindrical base material from 10 to 50° C., when from 50 to 90% of the fixed diffusion time has passed. The cylindrical base material is heated from the outer diameter part, and the diffusion is finished before the center reaches the changed temperature, whereby only the periphery is more thermally diffused, and as a result, the core diameter ratio can be made large.

By forming the cylindrical base material obtained by the present invention into a fiber, the graded-refractive-index optical fiber can be obtained. The method for forming into a fiber is not particularly limited, but a method of conducting heat drawing or melt spinning of the base material, is preferred. The condition such as the heating temperature or the velocity of formation of a fiber during the heat drawing or the melt spinning can be determined suitably by the types of the fluoropolymer (a) and the substance (b).

The degree of reducing the pressure when forming the cylindrical base material obtained by the present invention into a fiber while keeping the hollow part under reduced pressure, and closing the hollow part of the base material, is preferably from −1 to −300 mmHg, more preferably from −3 to −100 mmHg. If the degree of reducing the pressure is too small, it is hard to close the hollow part sufficiently, the residues of the hollow part remain partially and the transmission loss property deteriorates. And, if the degree of reducing the pressure is too large, the hollow part is closed rapidly, less likely to adhere sufficiently, thus the transmission loss property deteriorates.

The viscosity of the base material when forming into a fiber, is preferably from $10^2$ to $10^5$ poise. A too low viscosity results in a too soft fiber, a large linear diameter fluctuation and an unstable transmission loss, such being undesirable. And, a too high viscosity results in difficulty in spinning and large drop in the productivity, such being undesirable. And, it is possible to leave uniformly the hollow part having an outer diameter of from 0.1 to 100 μm in the fiber center by adjusting the degree of reducing the pressure by from −5 to −20 mmHg, and the viscosity of the base material by from $10^3$ to $10^4$ poise or from $10^3$ to $10^5$ poise, whereby the occurrence of the void during the cooling-curing of the fiber can be inhibited.

EXAMPLES

Now, the present invention will be described in further detail with reference to Examples.

Example 1 (Preparation for the Cylindrical Base Material)

100 g of polymer 11 of perfluoro(butenyl vinyl ether) [PBVE] having a number average molecular weight of about 1.5×10⁵ (hereinafter referred to as polymer A) was molten at a temperature of 250° C., and a glass tube was selected as the cylindrical outer wall material 12, into which the polymer A was poured through the plug 13. Then the predetermined internal space was taken and the polymer A was sealed in by plug 14, the inside of the glass tube 12 was made vacuum, the tube was kept horizontal and set to the rotational tube 16 in the hot air circulating type oven 15 equipped with rotational mechanism, as illustrated in FIG. 4. The temperature in the oven 15 was raised to 250° C.±1° C., and the glass tube 12 was heated for three hours while being rotated at 2,000 rpm. Then, the power source of the oven was turned off, the glass tube 12 was air-cooled forcibly by a fan for one hour and the cylindrical base material 20 having an outer diameter of 17 mm, an inner diameter of 5 mm, a length of 200 mm and a refractive index of 1.34, illustrated in FIG. 5 was obtained.

Example 2 (Example to keep the Hollow Part of the Cylindrical Base Material under Reduced Pressure)

Figure 7:
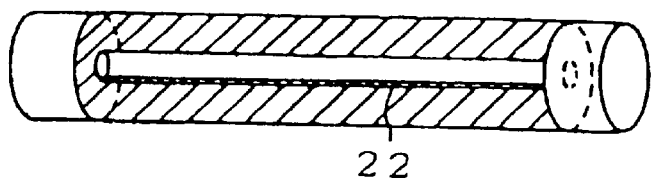
FIG. 7 is a schematic view illustrating an embodiment of the method for the production of a cylindrical base material in the present invention.
Figure 8:
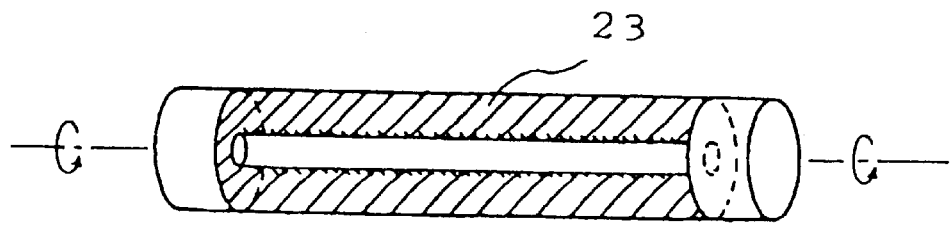
FIG. 8 is a schematic view of the cylindrical base material in the present invention.

Then, a chlorotrifluoroethylene (CTFE) oligomer having a number average molecular weight of 1,000 (hereinafter referred to as polymer B) was added at a ratio of 4 wt % to the polymer A, into the hollow part of the cylindrical molded body 20 as the high-refractive-index layer forming material 22 (FIG. 7). The polymer B whose end-group was fluorinated in advance, was used. The inside of the glass tube 12 was made vacuum, and the tube was, while being kept horizontal, set into the hot air circulating type oven 15 equipped with rotational mechanism again. The polymer B was thermally diffused by rotating the glass tube 12 at 2,000 rpm while controlling the internal temperature of the oven at 220° C.±1° C., and heating for six hours while exerting 9 G to the hollow part. Then, the oven was gradually cooled at a constant temperature of 15° C./hr to room temperature. As a result, a graded-refractive-index cylindrical base material 23, having an outer diameter of 17 mm, an inner diameter of 4.5 mm, a length of 200 mm, a central refractive index of 1.355 and a refractive index of the outer diameter part of 1.34 as illustrated in FIG. 8, was obtained. The obtained base material 23 had a hollow part in the center, and thus is excellent in uniformity without voids, bubbles or deformation of the base material resulting from the cooling shrinkage of the base material.

Figure 9:
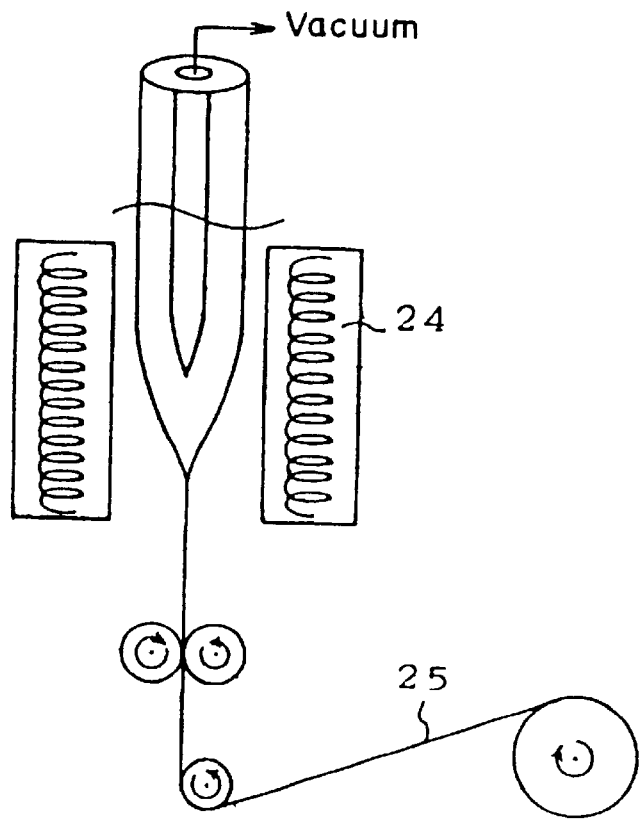
FIG. 9 is a schematic view of a wiredrawing device for the cylindrical base material in the present invention.
Figure 10:
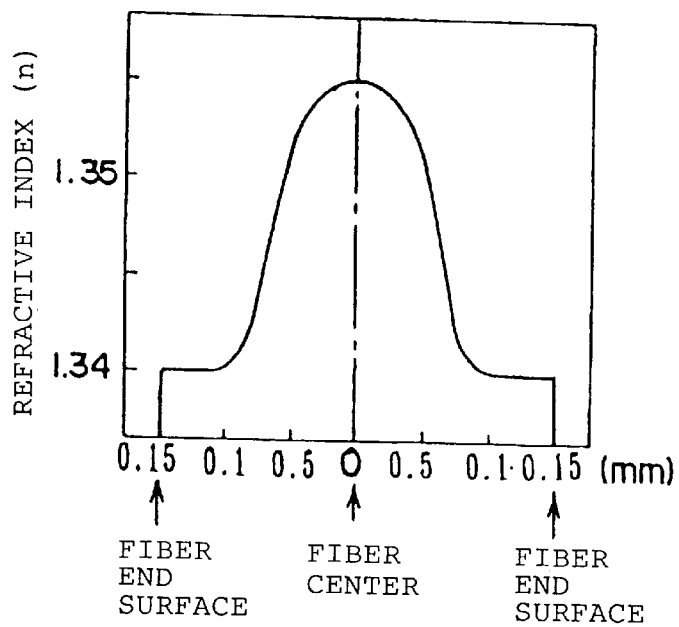
FIG. 10 shows a refractive index gradation in the cross sectional direction of a fiber obtained by the present invention.

This base material was set in the wiredrawing furnace 24 kept hot at a temperature of 220° C., as illustrated in FIG. 9, the vacuuming pipe was fixed at the upper part of the hollow part of the base material, followed by wiredrawing at a velocity of 6 m/min while keeping the hollow part under reduced pressure, to obtain a graded-refractive-index optical fiber 25 having an outer diameter of 300±5 μm. The refractive index gradation profile of the obtained fiber 25 measured by the cross-direction interference pattern method, shows a gradation profile having 1.355 at the center and 1.34 at the periphery, as illustrated in FIG. 10. The result of the transmission loss by the cut back method was 40 dB/km with a light of a wavelength of 1,300 nm.

According to the present invention, the core diameter of the fiber which relates to the light transmission loss, the refractive index gradation profile influencing the bond property, and the loss by connection to the light source, can be relatively easily adjusted. Such examples will be given in Examples 3 to 6.

Example 3 (Examples of Influences of the Amount of Added Polymer B)

Figure 11:
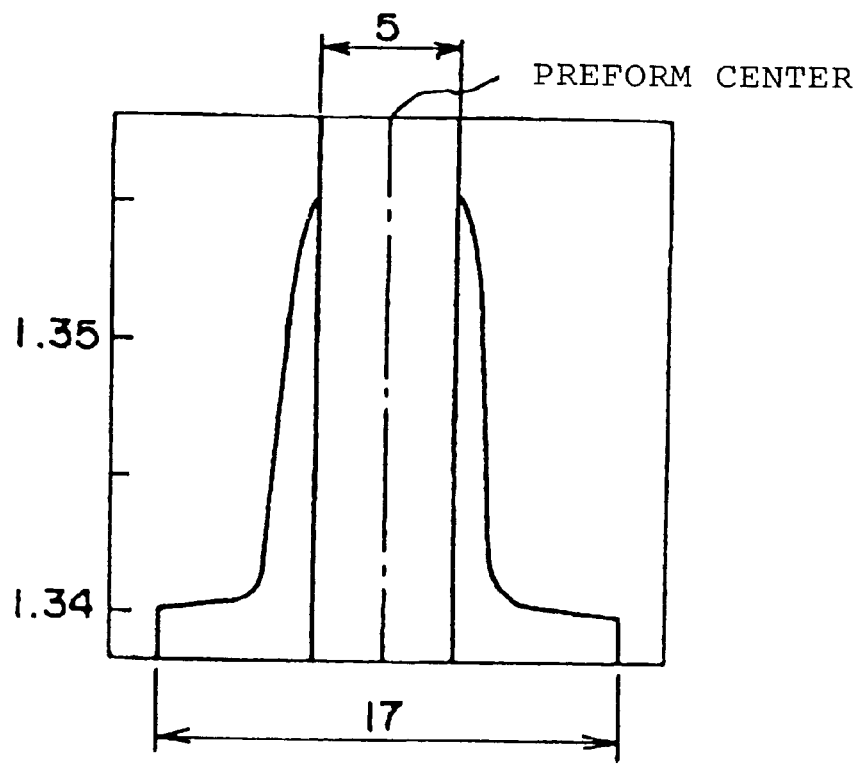
FIG. 11 shows a refractive index gradation in the cross sectional direction of the cylindrical base material in the present invention (2 wt %).
Figure 12:
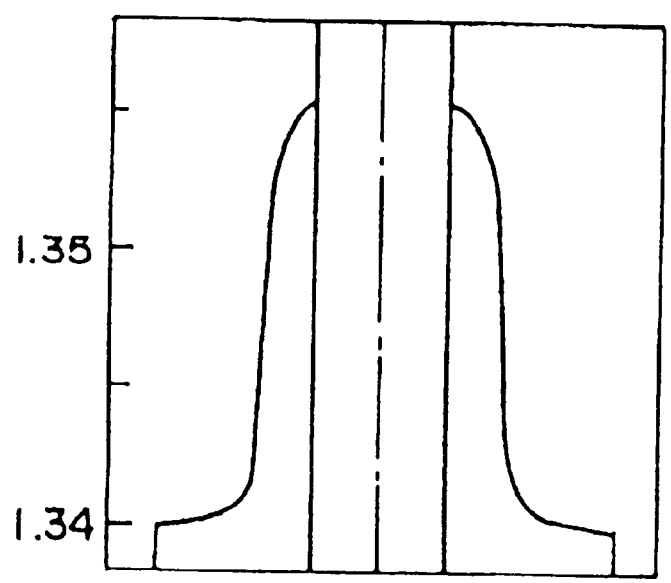
FIG. 12 shows a refractive index gradation in the cross sectional direction of the cylindrical base material in the present invention (5 wt %).
Figure 13:
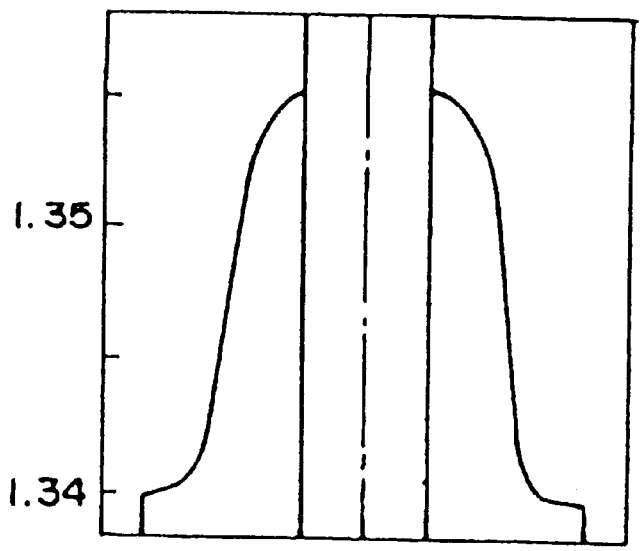
FIG. 13 shows a refractive index gradation in the cross sectional direction of the cylindrical base material in the present invention (7 wt %).
Figure 14:
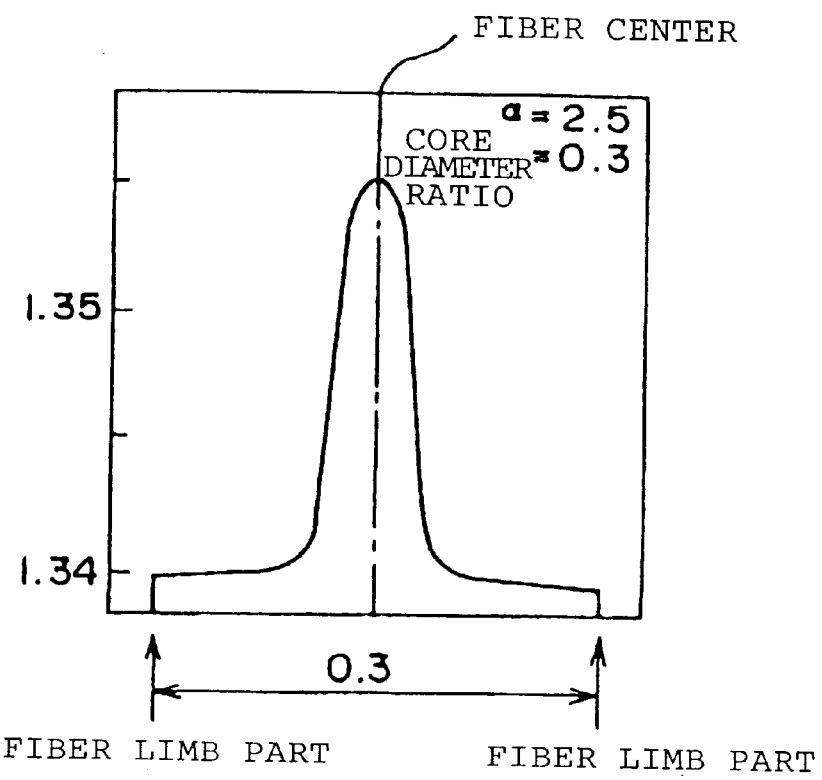
FIG. 14 shows a refractive index gradation in the cross sectional direction of the fiber in the present invention (2 wt %).
Figure 15:
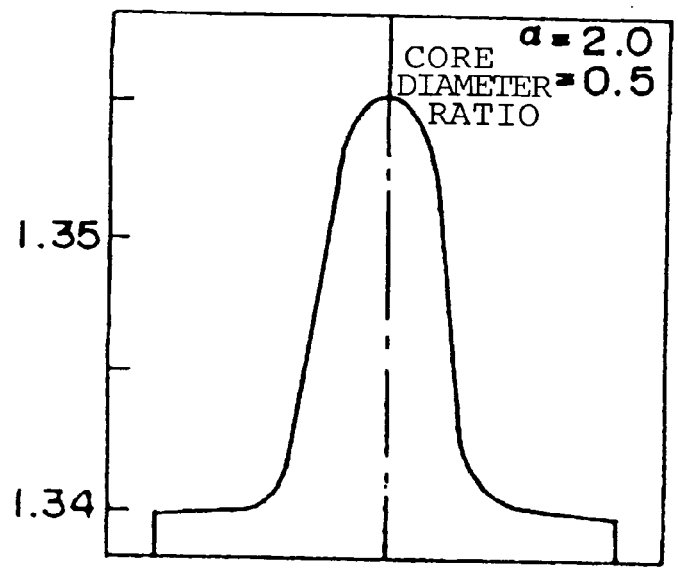
FIG. 15 shows a refractive index gradation in the cross sectional direction of the fiber in the present invention (5 wt %).
Figure 16:
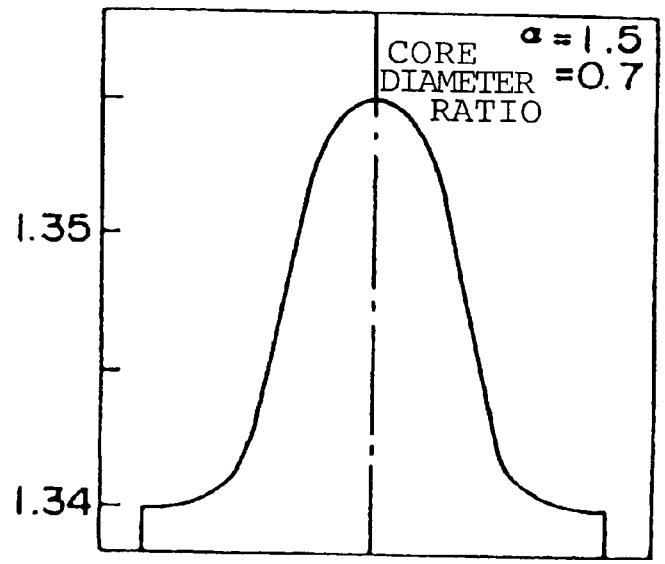
FIG. 16 shows a refractive index gradation in the cross sectional direction of the fiber in the present invention (7 wt %).

The polymer B was added at a ratio of 2, 5 or 7 wt % to the polymer A into the hollow part of the cylindrical base material 20, having an outer diameter of 17 mm and an inner diameter of 5 mm, made of the polymer A, and diffused for a predetermined time at a temperature of 240° C. until the concentration of the polymer B in the inner wall part reached 15 wt %, whereupon the refractive index gradation profile of the base material was measured and illustrated in FIG. 11, 12 or 13 respectively. And, the refractive index gradation profile of the fiber having an outer diameter of 250 μm, obtained from each base material, was illustrated in FIG. 14, 15 or 16 respectively. As a result, the a value represented by the following formula to be a guide showing the refractive index gradation profile in the core radius direction (power-law) can be changed from 1.5 to 2.5;

$$n(r)=n_1[1-2\Delta(r/a)^\alpha]^{1/2}$$

$$\Delta=n_1^2-n_2^2/2n_1^2$$

n(r): Refractive index in radius r direction
a: Core radius
$n_1$: Core refractive index
$n_2$: Cladding refractive index
and the ratio of the core diameter to the outer diameter of the fiber (core diameter ratio) can be changed from 0.3 to 0.7.

Example 4 (Examples of Influences of the Change in the Inner Diameter of the Cylindrical Molded Body)

Figure 17:
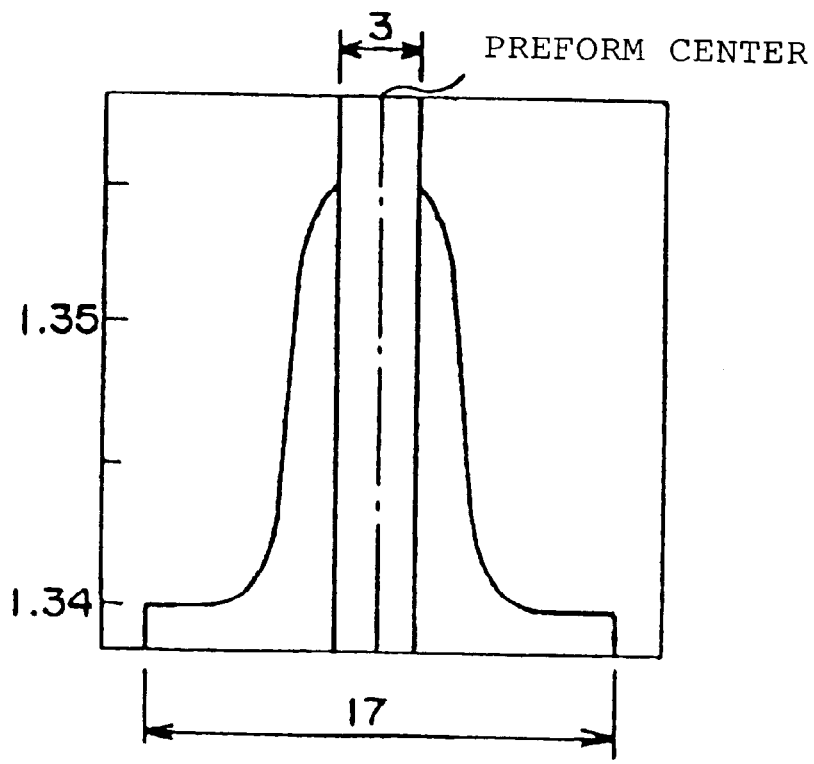
FIG. 17 shows a refractive index gradation in the cross sectional direction of the cylindrical base material in the present invention (inner diameter: 3 mm).
Figure 18:
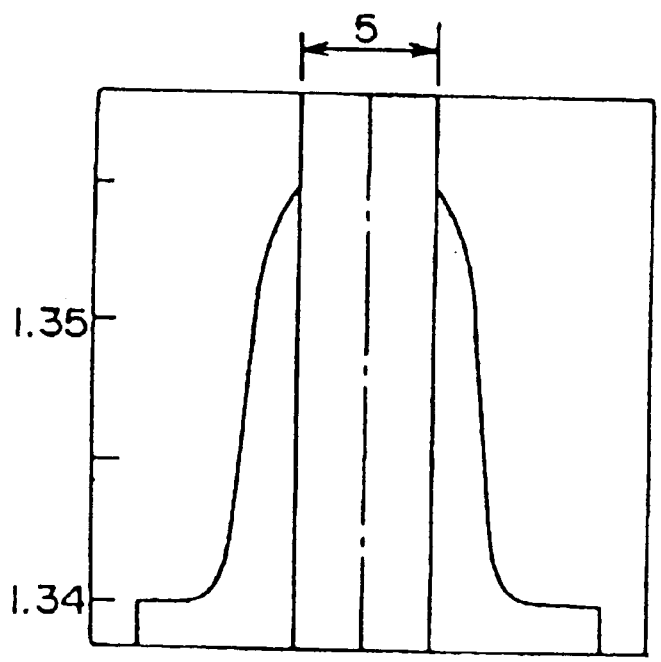
FIG. 18 shows a refractive index gradation in the cross sectional direction of the cylindrical base material in the present invention (inner diameter: 5 mm).
Figure 19:
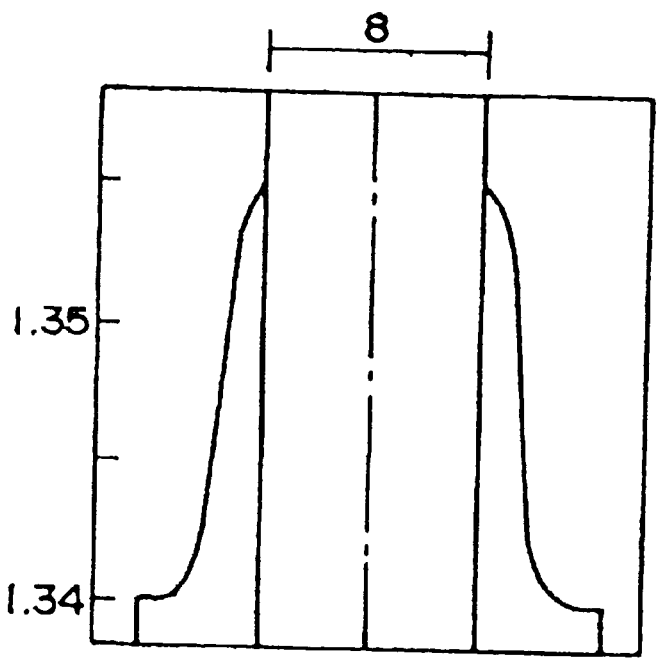
FIG. 19 shows a refractive index gradation in the cross sectional direction of the cylindrical base material in the present invention (inner diameter: 8 mm).
Figure 20:
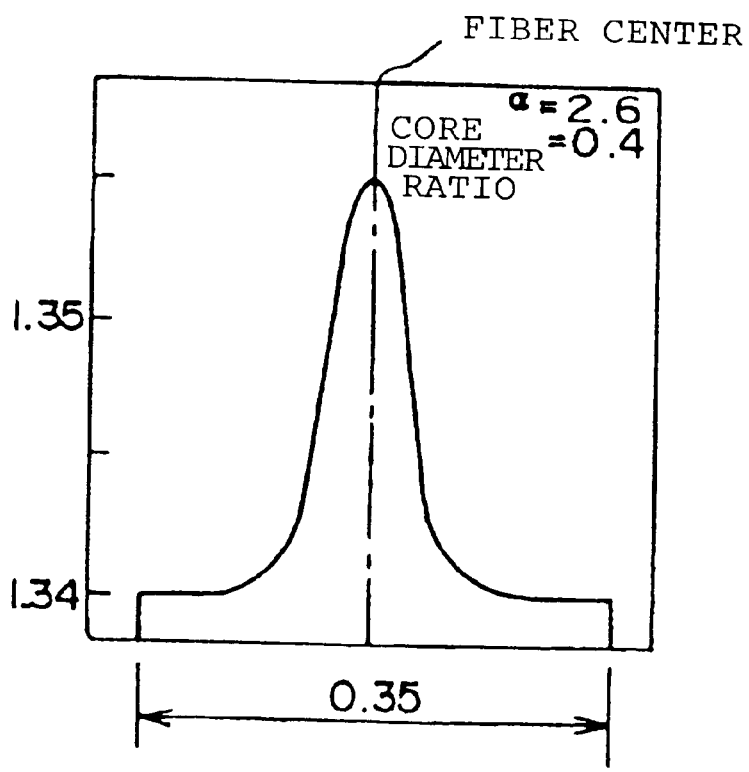
FIG. 20 shows a refractive index gradation in the cross sectional direction of the fiber in the present invention (inner diameter: 3 mm).
Figure 21:
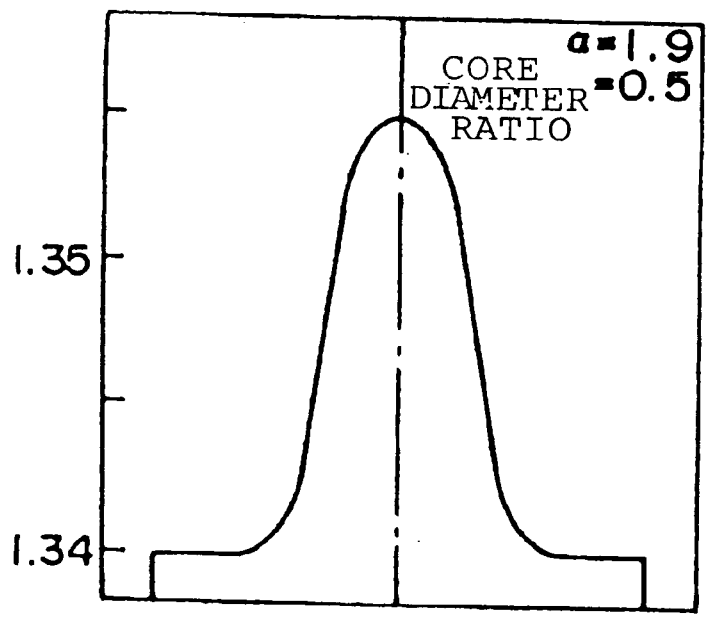
FIG. 21 shows a refractive index gradation in the cross sectional direction of the fiber in the present invention (inner diameter: 5 mm).
Figure 22:
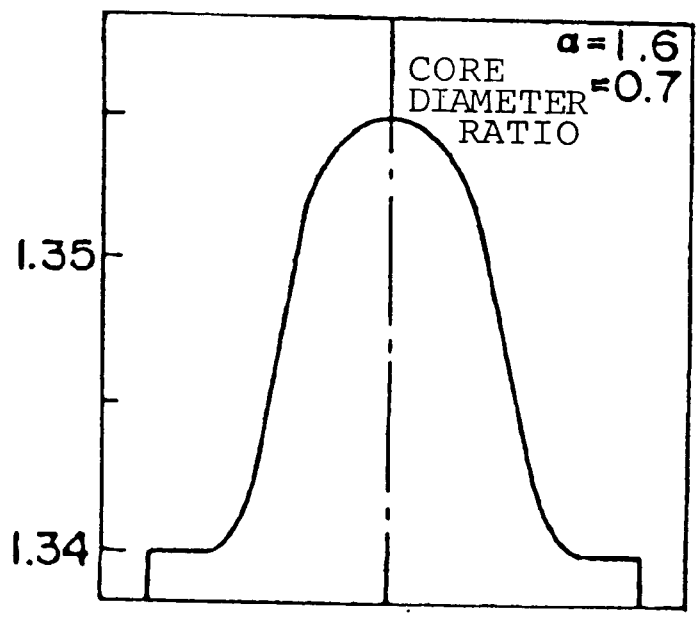
FIG. 22 shows a refractive index gradation in the cross sectional direction of the fiber in the present invention (inner diameter: 8 mm).

The diameter of the hollow part of the hollow cylindrical base material 20, having an outer diameter of 17 mm, made of polymer A, was changed to 3, 5 or 8 mm, polymer B was added to each of them at a ratio of 4 wt % to the polymer A and diffused for a predetermined time at a temperature of 220° C. until the concentration of the polymer B in the inner wall part reached 15 wt %, whereupon the refractive index gradation profile of the base material was measured and illustrated in FIG. 17, 18 or 19 respectively, and the refractive index gradation profile of the fiber having an outer diameter of 350 μm, obtained from each base material was illustrated in FIG. 20, 21 or 22 respectively. As a result, the α value can be changed from 1.6 to 2.6, and the core diameter ratio can be changed from 0.4 to 0.7. When the diameter of the hollow part is at most 2 mm (at most 12% to the outer diameter), the void occurrence resulting from the shrinkage can not be inhibited, and when at least 10 mm (at least 60% to the outer diameter), the hollow part does not adhere sufficiently during wiredrawing, the circularity of the fiber deteriorates, and the transmission loss property deteriorates.

Example 5 (Example to Change the Centrifugal Force)

The velocity v of polymer B to move in the rotational radius direction by the centrifugal force, when perfluoro (butenyl vinyl ether) and CTFE oligomer are used as the polymer A and the polymer B respectively, is represented as follows.

$$v=dr/dt=M(1-V\rho)r\omega^2/Na\cdot f$$

M: Molecular weight of polymer B (1000)
r: ½ of the inner diameter of the hollow part of the cylindrical base material (cm)
ω: Angular speed (sec⁻¹)
V: Partial specific volume of polymer B (=1/relative density=1/2.2 cm³/g)
ρ: Relative density of polymer A (=2.03 g/cm³)

Na: Avogadro number f: Friction factor of polymer B (Pa·sec·cm)

Figure 23:
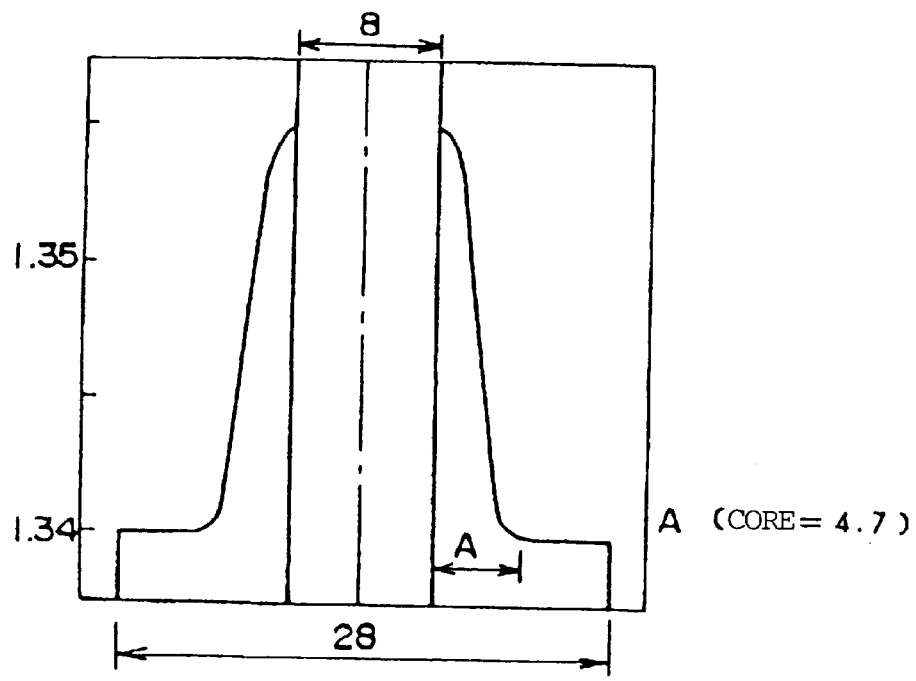
FIG. 23 shows a refractive index gradation in the cross sectional direction of the cylindrical base material in the present invention (rotational speed: 2,000 rpm).
Figure 24:
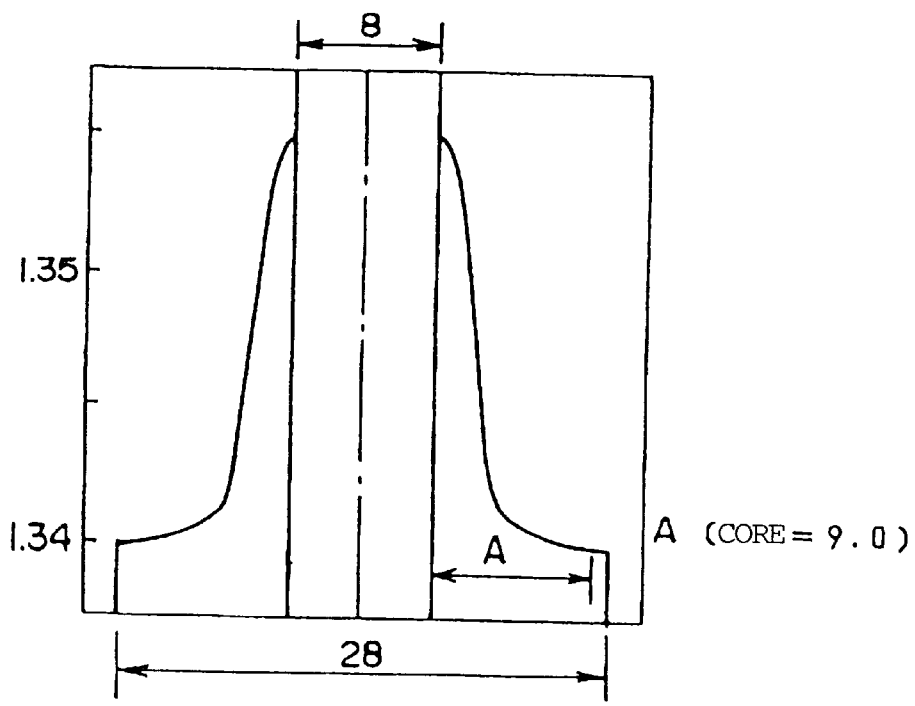
FIG. 24 shows a refractive index gradation in the cross sectional direction of the cylindrical base material in the present invention (rotational speed: 10,000 rpm).

Polymer B was poured at a ratio of 4 wt % to polymer A into the hollow part of the cylindrical base material made of polymer A, having an outer diameter of 28 mm and an inner diameter of 8 mm, and diffused at a temperature of 220° C., at 2,000 rpm (a centrifugal force of 9 G) for 10 hours, until the concentration of the polymer B of the hollow inner wall part reached 15 wt %, whereupon the refractive index gradation profile was measured and illustrated in FIG. 23. On the other hand, after five hours from the initiation of the diffusion, the rotational speed was changed from 2,000 rpm to 10,000 rpm (a centrifugal force of 25 G), to let the centrifugal force positively act particularly on the polymer B which was located on the peripheral side, among the polymer B during the diffusion. As a result, the diffusion of polymer B located on the peripheral side, was more activated, and the core diameter could be made 1.9 times longer at the refractive index gradation profile of the base material after 10 hours, as illustrated in FIG. 24.

Example 6 (Examples of Influence of Adding the Polymer B Gradually)

The polymer B was added at a ratio of 4 wt % to the polymer A into the hollow part of the cylindrical base material made of the polymer A, having an outer diameter of 17 mm and an inner diameter of 4 mm, and diffused for 5 hours at a temperature of 220° C. until the concentration of polymer B in the inner wall part reached 13.5 wt % whereupon the refractive index gradation profile of the base material was measured and illustrated in FIG. 25. And polymer b was added at a ratio of 3 wt % to polymer A, into the hollow part of the cylindrical base material of the same size, and diffused for 4 hours at a temperature of 220° C., and then, polymer C having polymer A and polymer B blended at a ratio of 85:15, was added to the hollow part of 8 wt %, and diffused for one hour, whereby a gradation profile having a large a value was obtained (FIG. 26).

What is claimed is:

1. A method for producing a graded-refractive-index optical fiber, which comprises:
    a) molding an amorphous fluoropolymer (a) which substantially has no C—H bond, and at least one substance (b) which differs from the fluoropolymer (a) in refractive index by at least 0.001; with, as a mold, a cylindrical molded body made of at least one of the above materials;
    b) forming at least one layer made of a layer-forming material having a refractive index which is higher than said material of said cylindrical molded body, and which is at least one of the above materials, on the inner surface of the cylindrical molded body by rotational molding to obtain a cylindrical base material having at least a two-layer structure of an inner and outer layer; and
    c) forming the obtained cylindrical base material into a fiber to produce a graded-refractive-index optical fiber, wherein the centrifugal force is increased from 1.5 to 30 times when from 50 to 90% of the predetermined diffusion time of substance (b) has elapsed.

2. The method of claim 1, wherein the centrifugal force is in the range of from 0.1 to 300 G.

3. The method of claim 1, wherein a hollow part of the cylindrical base material is maintained under reduced pressure when being formed into a fiber.

4. The method of claim 1, wherein one of the adjacent layers is made to have a concentration of the substance (b), and the substance (b) is thermally diffused from the layer having a concentration of the substance (b) to the other layer during the rotational molding or after rotational molding.

5. The method of claim 1, wherein the ratio of the cylindrical inner diameter to the cylindrical outer diameter of the cylindrical base material is from 10 to 70%.

6. The method of claim 1, wherein the outer diameter of the cylindrical base material is from 10 to 100 mm.

7. The method of claim 1, wherein said amorphous fluoropolymer has a cyclic structure in a main chain thereof.

8. The method of claim 7, wherein said cyclic structure campuses a fluorine-containing alicyclic structure, a fluorine-containing cyclic imide structure, a fluorine-containing triazine ring structure, or fluorine-containing aromatic ring structure.

9. The method of claim 7, wherein said cyclic structure comprises a fluorine-containing aliphatic ether ring structure.

10. The method of claim 1, wherein said amorphous fluoropolymer has a viscosity in a molten state of four about $10^3$ to $10^5$ poise at a melt temperature of from 200 to 300° C.

11. The method of claim 1, wherein said amorphous fluoropolymer has a number-average molecular weight of from about 10,000 to 5,000,000.

12. The method of claim 11, wherein the number-average molecular weight is from about 50,000 to 1,000,000.

13. The method of claim 7, wherein the amorphous fluoropolymer contains a polymeric unit having a cyclic structure in an amount of at least 20 mol %.

14. The method of claim 13, wherein the amorphous fluoropolymer contains a polymeric unit having a cyclic structure in an amount of at least 40 mol %.

15. The method of claim 1, wherein said substance (b) comprises a halogenated aromatic hydrocarbon, or a fluoropolymer or fluoropolymer.

16. The method of claim 15, wherein said halogenated aromatic by decarbon comprises 1,3-dibromotetrafluorobenzene, 1,4-dibromotetrafluorobenzene, 2-bromotetrafluorobenzotifluoride, chloropentafluorobenzene, decafluorobenzophenane, perfluoroacetophenane, perfluorobiphenyl, chloroheptafluoronapthalene, or bromoheptafluorophthalene.

17. The method according to claim 1, wherein said at least one substance (b) has a refractive index different from said fluoropolymer (a) by at least 0.005.

18. The method according to claim 1, wherein said at least one substance (b) has a solubility parameter within 7 (cal/cm$^3$)$^{1/2}$ of the fluoropolymer (a).

19. The method according to claim 1, wherein said at least one substance (b) is an oligomer of tetrafluoroethylene, chlorotinfluoroethylene, dichlorodifluoroethylene, hexafluoropropylene and perfluoroalkyl vinyl ether or an oligomer of any two of these.

20. A method for producing a graded-refractive-index optical fiber, which comprises:
    a) producing a base material for producing a graded-refractive-index optical fiber by molding an amorphous fluoropolymer (a) which substantially has no C—H bond and at least one substance (b) which differs from the fluoropolymer (a) in refractive index by at least 0.001 with, as a mold, a cylindrical molded body made of at least one of the above materials;
    b) forming at least one layer made of a layer-forming material having a refractive index which is higher than said material of said cylindrical molded body, and which is at least one of the above materials, on the inner surface of the cylindrical molded body, by rotational molding to form a cylindrical base material having at least an inner and outer layer structure; and c) forming the obtained cylindrical base material into a fiber to produce a grated-refractive-index optical fiber, wherein the forming into a fiber is conducted while the hollow part of the above-cylindrical base material is maintained under reduced pressure, and wherein the centrifugal force is increased from 1.5 to 30 times when from 50 to 90% of the predetermined diffusion time of substance (b) has elapsed.

21. The method of claim 20, wherein one of the adjacent layers is made to have a concentration of substance (b), and substance (b) is thermally diffused from the layer having a concentration thereof to the other layer during or after the rotational molding.

22. The method of claim 20, wherein the ratio of the cylindrical inner diameter to the cylindrical outer diameter of the cylindrical base material is from 10 to 70%.

23. The method of claim 20, wherein the outer diameter of the cylindrical base material is from 10 to 100 mm.

24. The method of claim 20, wherein said amorphous fluoropolymer has a cyclic structure in a main chain thereof.

25. The method of claim 24, wherein said cyclic structure campuses a fluorine-containing alicyclic structure, a fluorine-containing cyclic imide structure, a fluorine-containing triazine ring structure, or fluorine-containing aromatic ring structure.

26. The method of claim 24, wherein said cyclic structure comprises a fluorine-containing aliphatic ether ring structure.

27. The method of claim 20, wherein said amorphous fluoropolymer has a viscosity in a molten state of four about $10^3$ to $10^5$ poise at a melt temperature of from 200 to 300° C.

28. The method of claim 20, wherein said amorphous fluoropolymer has a number-average molecular weight of from about 10,000 to 5,000,000.

29. The method of claim 28, wherein the number-average molecular weight is from about 50,000 to 1,000,000.

30. The method of claim 24, wherein the amorphous fluoropolymer contains a polymeric unit having a cyclic structure in an amount of at least 20 mol %.

31. The method of claim 30, wherein the amorphous fluoropolymer contains a polymeric unit having a cyclic structure in an amount of at least 40 mol %.

32. The method of claim 20, wherein said substance (b) comprises a halogenated aromatic hydrocarbon, or a fluoropolymer or fluoropolymer.

33. The method of claim 32, wherein said halogenated aromatic hydrocarbon comprises 1,3-dibromotetrafluorobenzene, 1,4-dibromotetrafluorobenzene, 2-bromotetrafluorobenzotifluoride, chloropentafluorobenzene, decafluorobenzophenane, perfluoroacetophenane, perfluorobiphenyl, chloroheptafluoronapthalene, or bromoheptafluorophthalene.

34. The method of claim 1, wherein in step c), the centifugal force is increased from 2 to 20 times.

35. The method of claim 20, wherein in step c), the centrifugal force is increased from 2 to 20 times.

* * * * *